(12) United States Patent
Aronovich et al.

(10) Patent No.: US 8,745,340 B2
(45) Date of Patent: Jun. 3, 2014

(54) REDUCTION OF COMMUNICATION AND EFFICIENT FAILOVER PROCESSING IN DISTRIBUTED SHARED MEMORY-BASED APPLICATION

(75) Inventors: Lior Aronovich, Toronto (CA); Asaf Levy, Rishon le Zion (IL); Liran Loya, Hod-Hasharon (IL)

(73) Assignee: International Business Machines Corporation, Armonk, NY (US)

( * ) Notice: Subject to any disclaimer, the term of this patent is extended or adjusted under 35 U.S.C. 154(b) by 66 days.

(21) Appl. No.: 13/488,139

(22) Filed: Jun. 4, 2012

(65) Prior Publication Data

US 2012/0246428 A1 Sep. 27, 2012

Related U.S. Application Data

(63) Continuation of application No. 12/958,190, filed on Dec. 1, 2010, now Pat. No. 8,489,829.

(51) Int. Cl.
*G06F 12/16* (2006.01)

(52) U.S. Cl.
USPC ........... 711/161; 711/118; 711/147; 711/162; 711/211; 714/6.23

(58) Field of Classification Search
USPC .......... 711/118, 147, 161, 162, 211; 714/6.23
See application file for complete search history.

(56) References Cited

U.S. PATENT DOCUMENTS

| | | | |
|---|---|---|---|
| 5,924,096 A | 7/1999 | Draper et al. | |
| 6,574,749 B1 | 6/2003 | Parsons | |
| 6,591,355 B2 | 7/2003 | Schuster et al. | |
| 7,200,623 B2 | 4/2007 | Chandrasekaran et al. | |
| 2002/0013889 A1* | 1/2002 | Schuster et al. | 711/203 |
| 2003/0191916 A1* | 10/2003 | McBrearty et al. | 711/162 |
| 2004/0193955 A1 | 9/2004 | Leete et al. | |
| 2006/0010170 A1* | 1/2006 | Lashley et al. | 707/200 |
| 2008/0040710 A1 | 2/2008 | Chiriac | |
| 2008/0183973 A1* | 7/2008 | Aguilera et al. | 711/147 |

OTHER PUBLICATIONS

Xie et al., "Adjusting Single-/Multiple-writer to False Sharing inSoftware DSMs", http://citeseerx.ist.psu.edu/viewdoc/summary?doi=10.1.1.34.9492, retrieved on Oct. 3, 2010, 7 pages.

Angela Demke Brown, "Lecture 16/17: Distributed Shaerd Memory", CSC469H1F, Fall 2006, http://www.cs.toronto.edu/~demke/469F.06/Lectures/Lecture16.pdf, retrieved on Oct. 3, 2010, 22 pages.

Fukuda et al., "Semi-Dynamic Distributed Data Managing Table for Distributed Shared Memory", IBM TDB v37 n5 05-94 p. 281-284, May 1, 1994, IP.com No. IPCOM000112451D, 5 pages.

Kermarrec, A M., et al., "A Recoverable Distributed Shared Memory Integrating Coherence and Recoverability", Proc. of the 25.sup.th FTCS, pp. 289-298, Jun. 1995.

* cited by examiner

*Primary Examiner* — Jae Yu
(74) *Attorney, Agent, or Firm* — Griffiths & Seaton PLLC

(57) ABSTRACT

Various embodiments for reducing communication between cluster nodes and optimizing failover processing in a distributed shared memory (DSM)-based application by at least one processor device are provided. In one embodiment, for a data structure operable on a DSM, a read-mostly portion is maintained in a single copy sharable between the cluster nodes while an updatable portion is maintained in multiple copies, each of the multiple copies dedicated to a single cluster node.

6 Claims, 5 Drawing Sheets

REDUCTION OF COMMUNICATION AND EFFICIENT FAILOVER PROCESSING IN DISTRIBUTED SHARED MEMORY-BASED APPLICATION

CROSS-REFERENCE TO RELATED APPLICATIONS

This application is a Continuation of U.S. patent application Ser. No. 12/958,190, filed on Dec. 1, 20101.

FIELD OF THE INVENTION

The present invention relates in general to computers, and more particularly to apparatus, method and computer program product embodiments for reducing network communication and facilitating efficient failover processing in a distributed shared memory (DSM)-based application in a computing environment.

DESCRIPTION OF THE RELATED ART

Distributed shared memory (DSM) provides an abstraction that allows users to view a physically distributed memory of a distributed system as a virtually shared address space. A central advantage of DSM is the convenience provided for the programmers of distributed applications, reducing or eliminating the requirement to be aware of the distributed architecture of the system and the requirement to use a less intuitive form of communication within a distributed system via message passing. Another advantage of DSM is the ability to directly port software written for non-distributed systems to work on distributed systems.

There are many forms of DSM algorithms, all of them sharing a fundamental architecture of being composed of distributed agents deployed on the clustered nodes (i.e. processors), each agent maintaining local data structures and memory data segments, and a communication protocol over a message passing layer being used to coordinate operations among the agents. A central goal of any DSM algorithm is to minimize message traffic for a given workload. An underlying goal is to maintain memory coherency of each agent and of the entire DSM.

SUMMARY OF THE INVENTION

In an application based on DSM, where data entities residing on DSM memory pages may be accessed intensively and interchangeably for writing and reading by multiple users across a DSM cluster, the DSM algorithms of the class described above, although optimized in themselves, may entail an intense messaging traffic, as pages are frequently invalidated to provide exclusive access and then shared again among respective cluster nodes.

Furthermore, such a usage pattern may make the process of failover more challenging and more costly in terms of the required processing time and messaging traffic. Failover is the process where one or more of the nodes in the cluster fail and eventually removed from the cluster, and the remaining nodes recover their internal and mutual consistency, such that normal operation is enabled after completion of the failover process. One challenge that may arise with the usage pattern described above is that the latest contents of the set of DSM pages for which the failed node was the last node to update their contents, may be lost and should be recovered using some application specific method or logic.

In view of the foregoing, a need exists for mechanisms facilitating reduction of DSM messaging traffic, and facilitating the process of recovery performed by remaining nodes during a failover operation. Accordingly, various embodiments for reducing communication between cluster nodes and optimizing failover processing in a distributed shared memory (DSM) by at least one processor device are provided. In one embodiment, by way of example only, for a data structure operable on a DSM, a read-mostly portion is maintained in a single copy sharable between the cluster nodes while an updatable portion is maintained in multiple copies, each of the multiple copies dedicated to a single cluster node.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
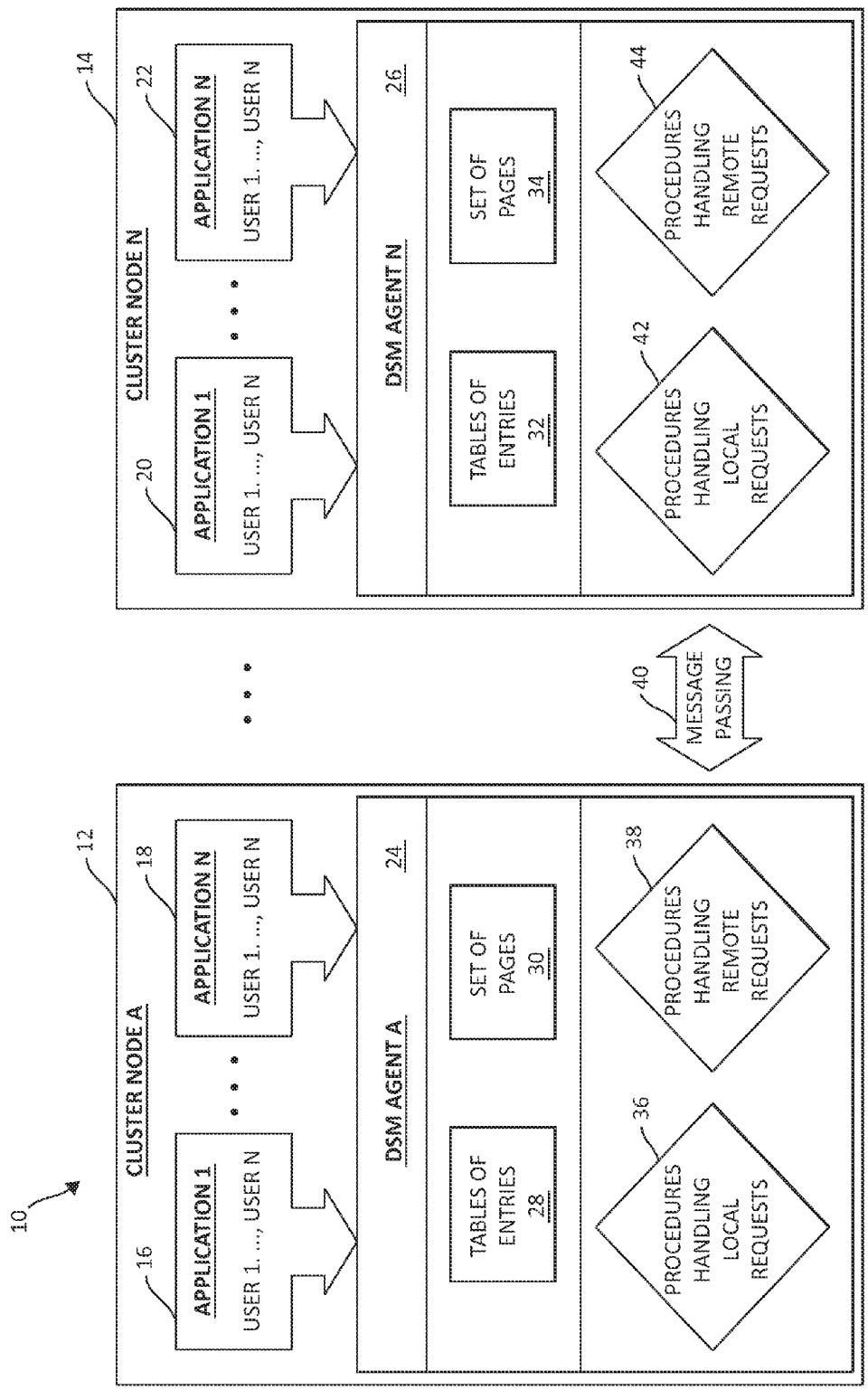
FIG. 1 illustrates an exemplary distributed shared memory (DSM) architecture in which aspects of the present invention may be implemented.

As previously mentioned, distributed shared memory (DSM) provides an abstraction that allows users to view a physically distributed memory of a distributed system as a virtually shared address space. The entire memory space of a DSM instance is partitioned into pages of arbitrary and possibly different sizes. A DSM agent resides on each of the clustered nodes. Each DSM agent manages a local set of memory pages, corresponding to the cluster-wide DSM memory space, and an associated table of entries. Each page is associated with an entry in that table.

A user may obtain permission to access a specific page, via the DSM agent servicing its node, atomically with respect to all other users on all nodes sharing the DSM instance. The permission may be shared, namely the data segment may be only read. This permission can be obtained concurrently by multiple users. Alternatively the permission may be exclusive, namely the data segment may be also modified. This permission is mutually exclusive with all other users. A valid permission generally refers to having either shared or exclusive permission. When granting permission, the latest contents of the page is also made available to the user (the local agent may obtain it from another agent over the network). The latest permission obtained for each page is recorded by each agent within its table of entries. Permissions are modified only due to user requests.

Each page has a single owner in the DSM instance, which is one of the DSM agents. The owner's identify (or approximate identify) for each page is recorded by each agent within the local entry associated with that page. The ownership of a page may be dynamically changed during processing of user requests, and different entries may have different owners. Generally, when a user request entails an upgrade of permission for a specific page, a request must be issued to the owner of that page. If the owner is not the local agent then the request is issued over the message passing layer to the remote owning agent. The owner of a page serializes processing of requests issued concurrently for that page, and has complete knowledge of the whereabouts of the latest contents of that page. Ownership of a page may be exchanged between the agents, triggered by processing of user requests, in the following cases: (1) when a user is given exclusive permission on a page, the DSM agent servicing its node is set as the owner of that page, and (2) when a user is given shared permission on a page and the remote owner does not have any permission on that page, the DSM agent servicing the node of the requesting user is set as the owner of that page.

Generally, when a user requests permission on a page, which entails upgrading the current permission held by the local DSM agent on the relevant page (upgrading means switching from no permission to shared or exclusive permission, or switching from shared permission to exclusive permission), a message is generated and sent by the DSM agent servicing the cluster node where the requesting user is operating. There are generally two types of messages: (1) a permission request: sent from a non owning agent to the agent owning the page, in order for the owning agent to process and grant the upgraded permission on that page, and (2) an invalidation request: sent from an agent owning a page to another agent, in a case where the owning agent requires to upgrade its permission from shared to exclusive, and the other agent may hold a shared permission and a valid copy of that page. There may be multiple non owning agents complying with this condition, and in such a case an invalidation message is sent to each such agent.

A DSM algorithm defines procedures to be performed by the DSM agents upon receiving an event. There are procedures for processing requests issued by local users. These procedures may generate and send request messages to remote agents, in accordance with the cases in the previous paragraph. There are also procedures for processing requests encoded in messages arriving from remote agents over the message passing layer. These procedures may generate and send response messages to the remote agents.

All of these procedures include a first step that checks for conditions that require the procedure to block until these conditions are cleared. These conditions apply for the specific entry and page for which a request is being processed by the procedure. One condition for blocking is mutual exclusion, namely enforcing a policy of multiple readers single writer. An additional widely used condition is blocking as long as there is an ongoing messaging session (i.e. a request followed by a response) initiated by the local agent with regards to the specific entry and page which are being processed. After this first step, a procedure proceeds to process the request, which may or may not include generating and sending a message to one or more remote agents.

FIG. 1 illustrates exemplary DSM architecture 10 in which aspects of the present invention may be implemented. Two exemplary cluster nodes, A and B (denoted by reference numbers 12, and 14) are represented, in which messages 40 are passed between. Turning first to cluster node 12, a number of applications 16, 18 are associated with a number of users (e.g., representative of 1 to n users) as shown. The 1 to n users represent threads of execution within these applications, where the threads perform logic that uses a DSM instance. A DSM agent 24 servicing the cluster node 12 is responsible for a table of entries 28 and a set of pages 30. For the DSM agent 24, a number of procedures for handling local and remote requests 36 and 38 are associated, where said procedures operate on the table of entries 28 and the set of pages 30. Similarly, in cluster node 14, a number of applications 20 and 22 are associated with a number of users (again, representative of 1 to n users). DSM agent 26 servicing the cluster node 14 is responsible for a table of entries 32 and a set of pages 34. As similarly described for DSM agent 24, for the DSM agent 26, a number of procedures for handling local and remote requests 42 and 44 are associated, where said procedures operate on the table of entries 32 and the set of pages 34. A specific example of a DSM algorithm of the class described above is specified in U.S. Patent Application Publication 2010/0049922, entitled "Distributed Shared Memory", and assigned to International Business Machines Corporation (IBM), the relevant portions therein incorporated by reference.

Again, and as previously described, in an application based on DSM, where data entities residing on DSM pages may be accessed intensively and interchangeably for writing and reading by multiple users across the cluster, the DSM algorithms of the class described above, although optimized in themselves, may entail an intense messaging traffic, as pages are frequently invalidated to provide exclusive access and then shared again among the nodes. Furthermore, such a usage pattern may make the process of failover more challenging and more costly in terms of the required processing time and messaging traffic.

The illustrated embodiments following, present mechanisms for implementing DSM based applications and data structures, which support the usage pattern specified above, and enable to reduce the DSM mechanism's internal messaging traffic, and further facilitate the process of recovery performed by the remaining nodes during failover.

The basic DSM algorithm, whose main elements are described previously, optimizes and minimizes the internal communication between the DSM agents residing on the cluster nodes, based on a general usage pattern of a DSM application. The illustrated embodiments enable to further reduce the internal communication between the DSM agents, by means of architecting the DSM based application and the data structures it maintains over DSM pages in various aspects described below.

One aspect of the illustrated embodiments involves the packing of read-mostly portions and updatable portions of data structures into separate DSM pages. For each data structure, its read-mostly portion is maintained in a single copy, whereas its updateable portion is maintained in multiple copies, each copy dedicated to a single cluster node. To this regard, data structures are considered whose global state may be computed as an aggregation of separate and independent local states (in one exemplary embodiment a local state is associated with each cluster node), and update operations may be applied locally thus possibly modifying the local state of the respective data structure.

A DSM based application working with these data structures (operating from all or part of the cluster nodes), operates on their updateable portions such that each instance of the application (operating on a specific cluster node) updates only the DSM pages constituting the updateable copy dedicated to that cluster node. To compute the state of the overall data structure during a read access, the DSM based application operating on a specific cluster node reads (i.e. using shared permissions) also the updateable copies of the respective data structure associated with the other cluster nodes, whose data and state are relevant for the computation, and performs the aggregations required for computing the overall state of the data structure.

The benefits of the proposed method include significant reduction of the internal communication between the DSM agents, since read-only operations accessing only the read-mostly portions of the data structure do not entail any communication, and since updates of node specific updateable copies generally do not entail communication. Communication is generally required only for read accesses to other nodes' updateable copies (which is done selectively, only for the nodes whose data is indeed required), and to reacquire exclusive permissions for such copies after they are read. Thus, the illustrated embodiments are beneficial for an update intensive access pattern. For such access pattern, and without the application of the proposed method, heavy messaging traffic and costs will be entailed. Additionally, in an application where DSMs are used as a caching mechanism for a distributed file system, and ownership exchanges may involve also I/O operations (e.g. to persist page's contents before exchanging its respective ownership), the proposed method significantly reduces these I/O operations. An additional benefit is efficient and simplified processing of failover, since only the updateable copies dedicated to the failed nodes are lost, and the rest of the nodes have their updatable copies valid, based on which the new aggregated states of the data structures can be easily computed.

For applications where the access pattern consists of applying update and read operations interchangeably with each other from all cluster nodes (rather than having some bulks of operations of the same type), and where computing the overall state of a data structure requires aggregation of the update operations generated by all the cluster nodes pertaining to the respective data structure, having a single copy in the DSM of the updateable portion of a data structure may be more efficient, since the above access pattern entails generation of messages essentially for every access to the updatable portion. For this access pattern, a second exemplary embodiment is provided, where for each data structure, a single copy of the updateable portion of the data structure is maintained in the DSM, and multiple separate and independent copies of the updateable portion of the data structure are maintained in the local memories of each of the cluster nodes (i.e. local memories which are not associated with DSM). These local copies are maintained by the DSM based applications, rather than by the DSM agents. This is different from the previous exemplary embodiment where multiple dedicated copies are defined in the DSM, each associated with a single cluster node. The remaining aspects of the second exemplary embodiment are similar to those of the previous embodiment. As with the previous embodiment, operations that are based solely on the read-mostly portions of the DSM based data structures are efficient, requiring no internal DSM communication.

Referring again to the second exemplary embodiment, a DSM based application working with its data structures (operating from all or part of the cluster nodes), operates on their updateable portions such that each instance of the application (operating on a specific cluster node) updates the DSM pages constituting the single updateable copy of a data structure in the DSM, and also updates the node's local copy of the updatable portion of that data structure. To compute the overall state of the data structure during a read access, the DSM based application operating on a specific cluster node reads (i.e. using shared permissions) the single updateable copy of the respective data structure in the DSM (which already contains the aggregations required for obtaining the overall state of the data structure). To recover data structures during failover, a single node retrieves for each data structure the aggregated values stored in the local updateable copies of that data structure, contained in the local memories of each of the remaining nodes, calculates the new aggregated state of the data structure, and sets the new state values in the updateable copy of the respective data structure in the DSM.

First Exemplary Embodiment

A data structure implemented over a DSM is partitioned and packed into separate DSM pages using the following methodology. First, the data elements of the data structure are categorized according to their usage pattern. The first category, termed as read-mostly, consists of the data elements whose update frequency is significantly low relative to other data elements. An example would be a search key portion of a data structure, where the key is generally constant after the data structure is created. The second category, termed as updateable, consists of all other data elements. Namely, the elements whose update frequency is more intensive than that of the read-mostly elements.

The read-mostly data elements and the updateable data elements are packed into separate and independent DSM pages. Both the read-mostly portion of the data structure and the updateable portion of the structure may span across multiple DSM pages. For each data structure, a single copy of the DSM pages containing its read-mostly portion is defined. An effective implementation and usage of the read-mostly portion follows. For a containing data structure consisting of multiple individual data structures and supporting search operations over these data structures, where the search keys of the data structures are generally constant after the data structures have been created, the search keys portions are classified as read-mostly and are packed into separate DSM pages, and search operations are performed by accessing these pages using shared permissions.

Figure 2:
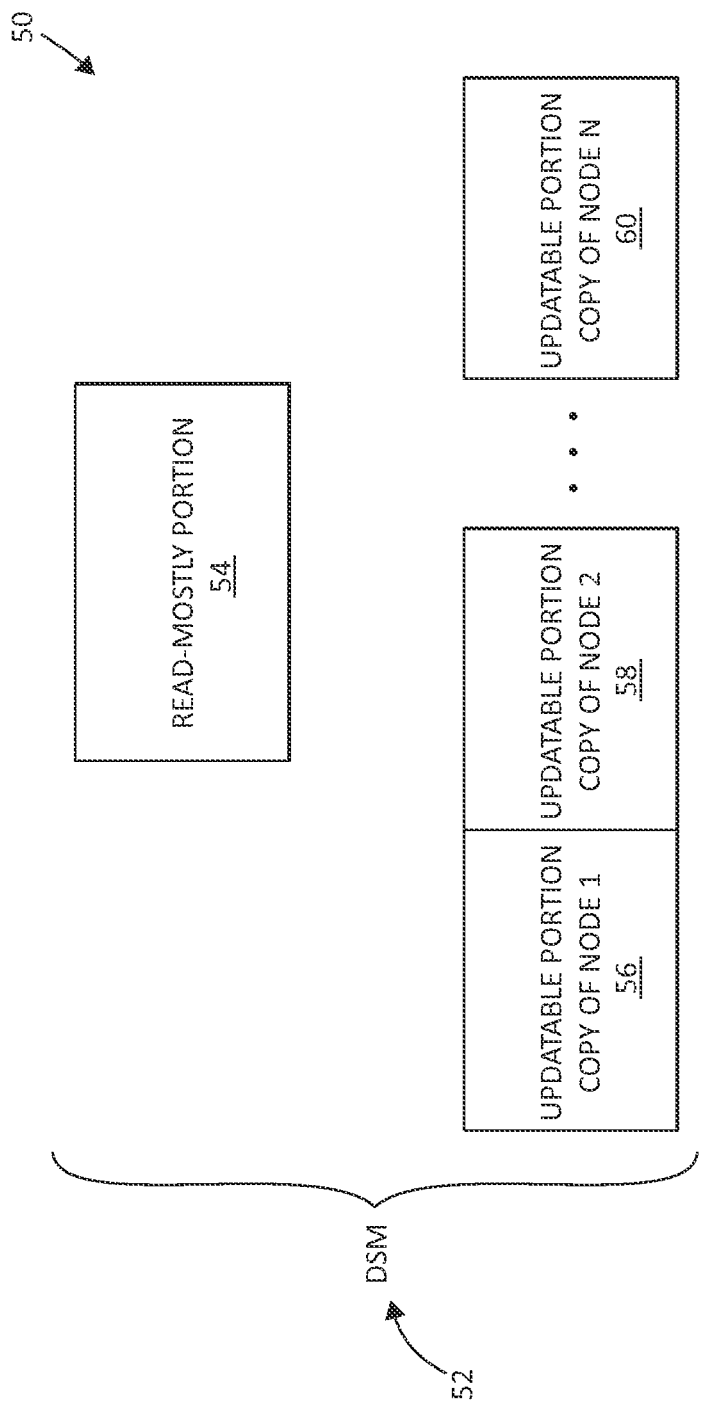
FIG. 2 illustrates an exemplary layout of a data structure into read-mostly and updatable portions, in which various aspects of the present invention may be implemented.

The updateable portion of each data structure is duplicated (in whole or in part) among the cluster nodes. Generally, a dedicated copy is defined in the DSM for each of the cluster nodes. A copy consists of one or more DSM pages dedicated to that node, containing the updateable portion of the data structure. Turning to FIG. 2, following, an exemplary layout of a data structure 50 over a DSM 52 is depicted for the first exemplary embodiment described above. The data structure is partitioned into the read-mostly portion 54, and updatable portion copies of various cluster nodes 56, 58, and 60 (corresponding to cluster nodes 1 to N in number).

A DSM based application working with data structures implemented in accordance with the above method, and operating from all or part of the cluster nodes, operates as follows. (1) Search: for locating an individual data structure within a containing data structure, and assuming that the search keys of the individual data structures are classified as read-mostly and stored in accordance with the above method, a read-only access is applied to the read-mostly portion of the containing data structure, using shared permissions, and a search method is used to locate the required individual data structure. (2) Update: to update the updateable portion of a data structure, each instance of the application (operating on a specific cluster node) updates only the DSM pages constituting the updateable copy of the respective data structure dedicated to that cluster node. (3) Read and state computation: to compute the overall state of a data structure during a read access, a DSM based application, operating on a specific cluster node, reads (using shared permissions) also the updateable copies of that data structure associated with all or part of the other nodes in the cluster (namely, only those nodes whose data is relevant for the computation), and performs the aggregations required for computing the overall state of the data structure.

(4) Failover processing: generally no processing is required to recover data structures during failover processing, thus failover processing is significantly simplified. This is because in the event of a node failure, only the failed node's copies of the updateable portions are lost, and the rest of the nodes have their copies of the updateable portions valid. Since generally only the remaining valid copies are relevant for computing the new overall states of the data structures, and these copies continue to be available for access, no processing is required to recover data structures.

The exemplary embodiment described previously provides the following benefits. First, operations that are based solely on the read-mostly portions of the data structures are efficient, since all the DSM agents across the cluster generally have shared permissions to these portions, and permission upgrades are rarely (or never) required, thus accessing these portions requires practically no internal DSM communication. When packing the read-mostly data elements constituting the search keys of a set of data structures, into separate DSM pages, high frequency search operations on the data structures are supported with minimal or no DSM internal communication.

In addition, the frequency of ownership passing operations is minimal, since the DSM based application operating on each node updates only its own dedicated copies of the updatable portions of the data structures. This significantly reduces internal DSM communication, and also reduces associated I/O operations in applications that use DSM as a caching mechanism for distributed file system (where I/O operations may be required to process ownership passing). Aspects of the exemplary embodiment described above are effective for an access pattern where updates from all cluster nodes are significantly frequent. These aspects work to eliminate the increasing effect of frequent update operations, which are the main generating driver of internal DSM messages, on the internal DSM communication traffic. Finally, failover processing is significantly simplified, since in the event of a node failure, only the failed node's copies of the updateable portions are lost, and the rest of the nodes have their copies of the updateable portions valid. Therefore, generally no processing is required to recover data structures during failover.

Second Exemplary Embodiment

For applications where the access pattern consists of applying update and read operations interchangeably with each other from all cluster nodes (rather than having some bulks of operations of the same type), and where computing the overall state of a data structure requires aggregation of the update operations generated by all the cluster nodes pertaining to the respective data structure (rather than accessing part of the cluster nodes), the second exemplary embodiment provides functionality as follows. First, the data elements of the data structure are categorized according to their usage pattern to read-mostly and updateable elements, which are packed into separate and independent DSM pages, similar to the first exemplary embodiment described previously.

For each data structure, a single copy of the DSM pages containing its read-mostly portion is defined, similar to the first exemplary embodiment. For each data structure, a single copy of the updateable portion of the data structure is maintained in the DSM, and multiple separate and independent copies of the updateable portion of the data structure are maintained in the local memories of each of the cluster nodes (i.e. local memories which are not associated with DSM).

These local copies are maintained by the DSM based applications, rather than by the DSM agents. This is different from the first exemplary embodiment, where multiple dedicated copies are defined in the DSM, each associated with a single cluster node.

Figure 3:
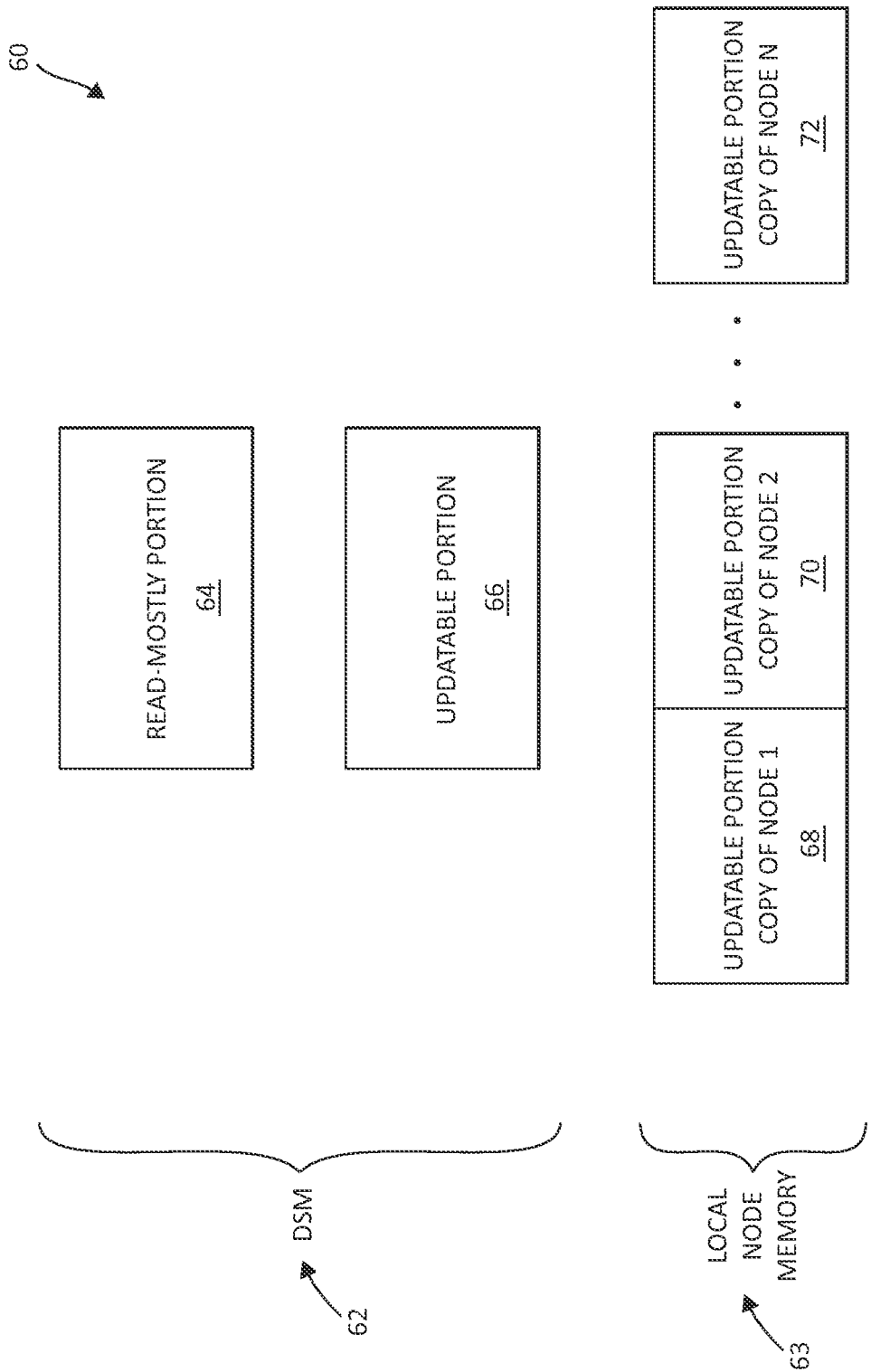
FIG. 3 illustrates an additional exemplary layout of a data structure.

Turning now to FIG. 3, an additional layout of an exemplary data structure 60 is shown. Data structure 60 is representative of the second exemplary embodiment introduced above. Data structure 60 includes read mostly portion 64, and an updateable portion 66 contained within the DSM 62. Updatable portion copies of nodes 1 to N (copies 68, 70, and 72) are contained within the local node memory 63 of each node as shown.

A DSM based application working with data structures implemented in accordance with the above exemplary embodiment, and operating from all or part of the cluster nodes, operates as follows. (1) Search: for locating an individual data structure within a containing data structure, and assuming that the search keys of the individual data structures are classified as read-mostly and stored in accordance with the above method, a read-only access is applied to the read-mostly portion of the containing data structure, using shared permissions, and a search method is used to locate the required individual data structure. (2) Update: to update the updateable portion of a data structure, each instance of the application (operating on a specific cluster node) updates the DSM pages constituting the single updateable copy in the DSM of the respective data structure, and also updates the node's local copy of the updatable portion of that data structure. The information recorded in a node's local copy of a data structure aggregates the effects of the update operations generated by the users of that node, while the information recorded in the DSM copy of a data structure aggregates the effects of the update operations generated by the users of all the cluster nodes.

(3) Read and State computation: to compute the overall state of a data structure during a read access, a DSM based application, operating on a specific cluster node, reads (using shared permissions) the single updateable copy of that data structure in the DSM. This copy already contains the aggregations required for obtaining the overall state of the data structure.

(4) Failover processing: to recover data structures during failover, a single node retrieves for each data structure the aggregated values stored in the local updateable copies of that data structure, contained in the local memories of each of the remaining nodes, calculates the new aggregated state of the data structure, and sets the new state values in the updateable copy of the respective data structure in the DSM.

As with the previous exemplary embodiment, operations that are based solely on the read-mostly portions of the data structures are efficient. For the access pattern specified above, for which the present exemplary embodiment is designed, the internal DSM communication traffic is significantly reduced. Efficient failover processing is facilitated using the copies of the updateable portions of the data structures stored in the local memories of each node.

Figure 4:
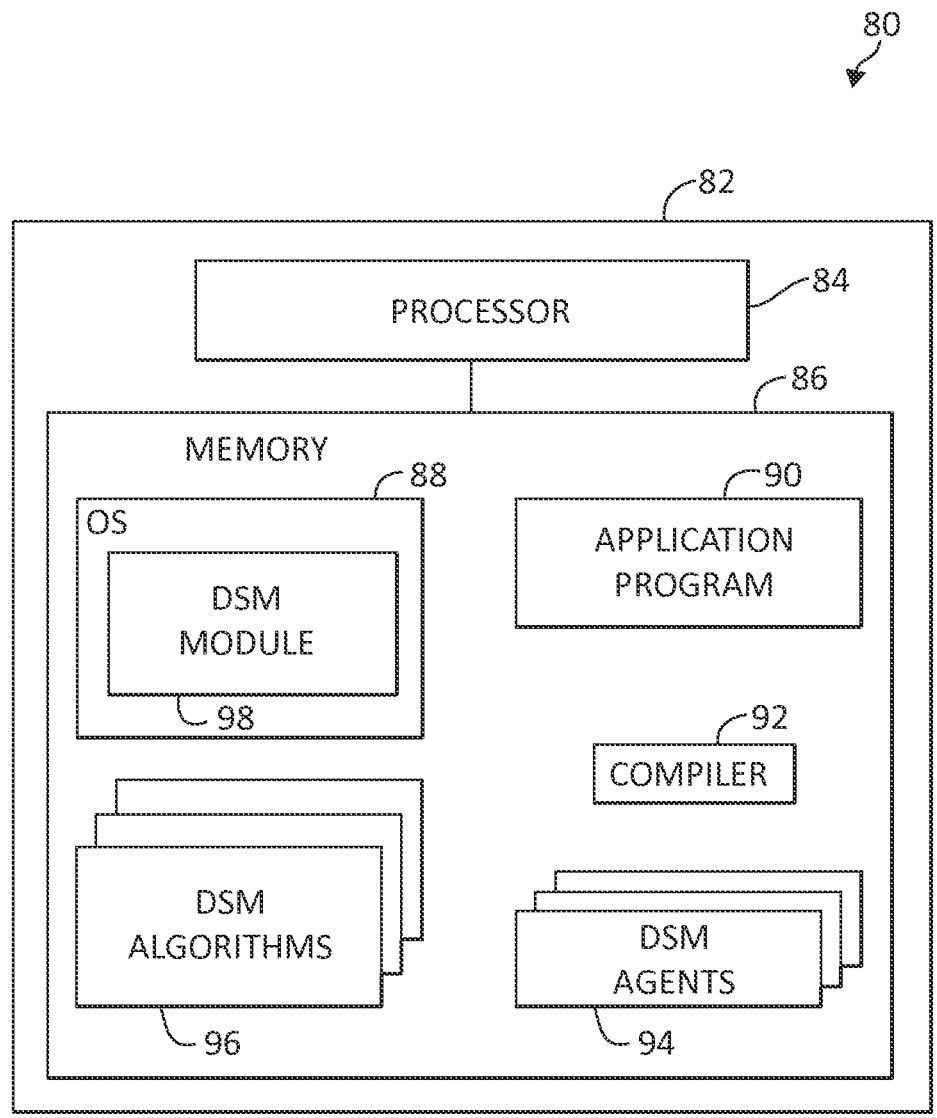
FIG. 4 illustrates an exemplary computer processing device adapted for carrying out various aspects of the present invention and following claimed subject matter.

Turning now to FIG. 4, an exemplary portion 50 of a DSM system 80 is illustrated. Portion 82 of DSM system 80 is operable in a computer environment as a portion thereof, in which mechanisms of the following illustrated embodiments may be implemented. It should be appreciated, however, that FIG. 4 is only exemplary and is not intended to state or imply any limitation as to the particular architectures in which the exemplary aspects of the various embodiments may be implemented. Many modifications to the architecture depicted in FIG. 4 may be made without departing from the scope and spirit of the following description and claimed subject matter.

Portion 82 includes a processor 84 and a memory 86, such as random access memory (RAM). The DSM system 80, and portion 82 may be operatively coupled to several components not illustrated for purposes of convenience, including a display, which presents images such as windows to the user on a graphical user interface, a keyboard, mouse, printer, and the like. Of course, those skilled in the art will recognize that any combination of the above components, or any number of different components, peripherals, and other devices, may be used with the DSM system 80 and/or portion 82.

In the illustrated embodiment, the portion 82 operates under control of an operating system (OS) 88 (e.g. z/OS, OS/2, LINUX, UNIX, WINDOWS, MAC OS) stored in the memory 86, and interfaces with the user to accept inputs and commands and to present results. In one embodiment of the present invention, the OS 88 facilitates DSM functionality according to the present invention. To this end, OS 88 includes a DSM module 98 which may be adapted for carrying out various processes and mechanisms in the exemplary methods described following.

Portion 82 may implement a compiler 92 that allows an application program 90 written in a programming language such as COBOL, PL/1, C, C++, JAVA, ADA, BASIC, VISUAL BASIC or any other programming language to be translated into code that is readable by the processor 84. After completion, the application program 90 accesses and manipulates data stored in the memory 86 of the system 80 using the relationships and logic that was generated using the compiler 92.

To further implement and execute mechanisms and processes according to the present invention, OS 88, in conjunction with memory 86, processor 84, application program 90, and other computer processing, networking, and storage components, may implement DSM agents 94 and DSM algorithms 96 employing various aspects of the previously described exemplary embodiments. As the skilled artisan will appreciate, the mechanisms of DSM algorithms 96 and DSM agents 94 as presently illustrated may be implemented in various forms and architectures. Accordingly, the illustration of DSM algorithms 96 and DSM agents 94 in the present figure is again intended to demonstrate logical relationships between possible computing components in the DSM system 80 and portion 82, and not to imply a specific physical structure or relationship.

In one embodiment, instructions implementing the operating system 88, the application program 90, and the compiler 92, as well as the DSM algorithms 96 and DSM agents 94 are tangibly embodied in a computer-readable medium, which may include one or more fixed or removable data storage devices, such as a zip drive, disk, hard drive, DVD/CD-ROM, digital tape, solid state drives (SSDs), etc. Further, the operating system 88 and the application program 90 may comprise instructions which, when read and executed by the system 80 and/or portion 82, cause the system 80 and/or portion 82 to perform the steps necessary to implement and/or use the present invention. Application program 90 and/or operating system 88 instructions may also be tangibly embodied in the memory 86. As such, the terms "article of manufacture," "program storage device" and "computer program product" as may be used herein are intended to encompass a computer program accessible and/or operable from any computer readable device or media.

Embodiments of the present invention may include one or more associated software application programs 90 that include, for example, functions for managing a distributed computer system comprising a network of computing devices, such as a storage area network (SAN). Accordingly, processor 84 may comprise one or more storage management processors (SMPs). The application program 90 may operate within a single computer and/or DSM 80 or as part of a distributed computer system comprising a network of computing devices. The network may encompass one or more computers connected via a local area network and/or Internet connection (which may be public or secure, e.g. through a virtual private network (VPN) connection), or via a fibre channel SAN or other known network types as will be understood by those skilled in the art.

Figure 5:
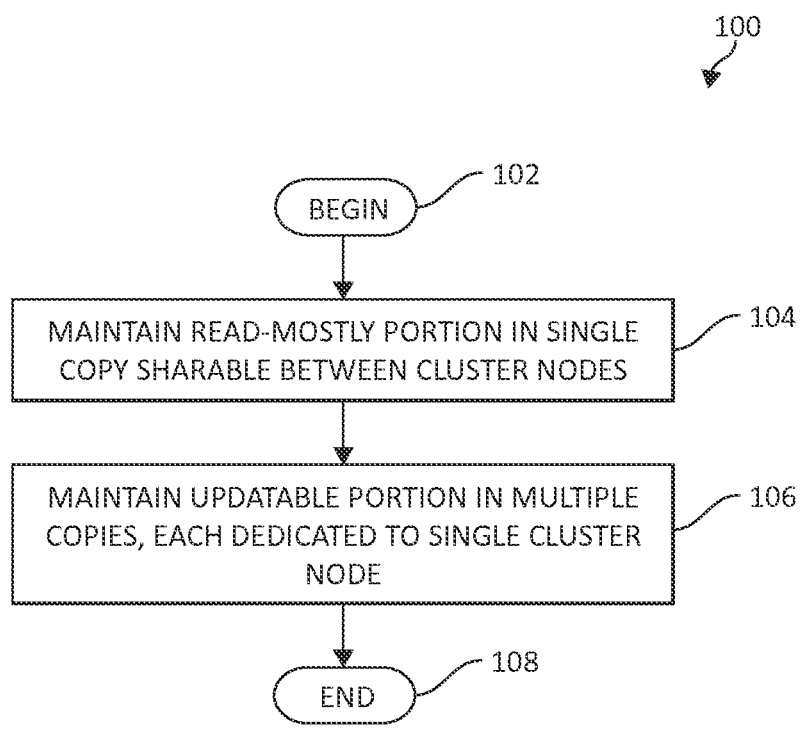
FIG. 5 illustrates a method for facilitating reduced network communication in a DSM architecture according to various aspects of the present invention.

Turning now to FIG. 5, an exemplary method 100 for facilitating reduced communication between cluster nodes and efficient failover in DSM systems is illustrated. In one embodiment, method 100 may be implemented using DSM system 80 and/or portion 82 (FIG. 4) components, or various other processing, networking, and storage components in computing environments. As one skilled in the art will appreciate, various steps in the method 100 may be implemented in differing ways to suit a particular application. In addition, the described method may be implemented by various means, such as hardware, software, firmware, or a combination thereof operational on or otherwise associated with the computing environment. For example, the method 100 may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums as has been previously described.

Method 100 begins (step 102) with the maintenance of a read-mostly portion of data in a single copy sharable between cluster nodes (step 104). Updatable portions are maintained in multiple copies, each dedicated to a single cluster node (step 106). The method 100 then ends (step 108).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for reducing communication between cluster nodes and optimizing failover processing in a distributed shared memory (DSM)-based application by at least one processor device, comprising:
   for a data structure operable on a DSM, packing read-mostly portions of the data structure and updatable portions of the data structures into separate DSM pages, the read-mostly portions being data elements whose update frequency is significantly low relative to other data elements in the data structure, the read-mostly portions including a search key portion of the data structure, wherein the search key is constant after the data structure is created, and the updatable portions of the data structures being the other data elements in the data structure;
   maintaining the read-mostly portions in a single copy sharable between the cluster nodes;
   duplicating the updatable portion to multiple copies, each of the multiple copies on DSM pages dedicated to a single cluster node;
   searching for an individual data structure by applying a read-only access to the read-mostly portions and implementing a search method to located the individual data structure;
   updating the updatable portions by updating only the DSM pages constituting the updatable portions of the data structure dedicated to the single cluster node; and
   computing an overall state of the data structure during a read access by operating on a specific cluster node and reading the updatable portions of the data structure, and performing an aggregation for computing the overall state of the data structure.

2. The method of claim 1, wherein the maintaining the read-mostly portion in the single copy and the duplicating the updatable portion to the multiple copies is performed for each of a plurality of data structures operable on the DSM.

3. The method of claim 1, wherein the read-mostly portion is maintained in a single location in the DSM, and the multiple copies of the updatable portion are maintained in a plurality of locations, each defined in the DSM and associated with the single cluster node.

4. The method of claim 3, wherein each copy of the multiple copies of the updatable portion is assigned for a specific DSM agent servicing a specific cluster node for performing write operations to a specific copy of the multiple copies of the updatable portion.

5. The method of claim 1, wherein the read-mostly portion is maintained in a single location in the DSM, and the multiple copies of the updatable portion are maintained in each of a plurality of local memory locations of the cluster nodes, the plurality of local memory locations not associated with the DSM.

6. The method of claim 1, wherein at least one of:
a copy of the updatable portion is maintained in the DSM,
the multiple copies are further maintained by at least one DSM-based application, and
the multiple copies and the single copy may span across multiple DSM pages.

* * * * *